United States Patent [19]

Rahman

[11] 4,096,283

[45] Jun. 20, 1978

[54] METHOD OF COMPACTING FREEZE-DRIED PARTICULATE FOODS

[75] Inventor: Abdul R. Rahman, Natick, Mass.

[73] Assignee: The United States of America as represented by the Secretary of the Army, Washington, D.C.

[21] Appl. No.: 740,261

[22] Filed: Nov. 8, 1976

[51] Int. Cl.$^2$ .......................... A23B 4/06; A23L 1/31
[52] U.S. Cl. ................................... 426/242; 426/277; 426/385; 426/634; 426/640; 426/641
[58] Field of Search ............... 426/126, 242, 385, 397, 426/277, 415, 456, 640, 646, 615, 444, 468, 512, 524, 641, 629, 634

[56] References Cited

U.S. PATENT DOCUMENTS

| 3,385,715 | 5/1968 | Ishler et al. | 426/274 |
|---|---|---|---|
| 3,427,171 | 2/1969 | Jeppson | 426/241 |
| 3,573,070 | 3/1971 | Smith et al. | 426/385 |
| 3,806,610 | 4/1974 | Rahman | 426/385 X |

OTHER PUBLICATIONS

*Freeze-Dehydration of Foods a Military–Industry Meeting,* Sept. 20–21, 1960 Chicago, Ill. p. 25.

*Primary Examiner*—William A. Cuchlinski, Jr.
*Attorney, Agent, or Firm*—Nathan Edelberg; Robert P. Gibson; Charles C. Rainey

[57] ABSTRACT

Method of compacting freeze-dried particulate foods comprising partially freeze-vacuum-dehydrating a food in particulate form to an average moisture content of about 10–35 percent, irradiating the frozen partially freeze-vacuum-dehydrated food with microwaves to rapidly distribute the remaining moisture from the frozen cores of the food particle throughout the food and thereby to uniformly plasticize the food, compressing the irradiated food to from about 5 to about 50 percent of its volume prior to compression, and thereafter redehydrating the compressed food to from about 1 to about 5 percent moisture content. The food particles may be either uncooked or cooked prior to partial freeze-vacuum-dehydration thereof, but will preferably be uncooked in the case of a vegetable and cooked in the case of a meat. The final redehydrated, compacted food mass may be hermetically sealed in moisture-impermeable containers to impart long-term storage stability thereto.

7 Claims, No Drawings

1

METHOD OF COMPACTING FREEZE-DRIED PARTICULATE FOODS

The invention described herein may be manufactured, used, and licensed by or for the Government for governmental purposes without the payment to me of any royalty thereon.

BACKGROUND OF THE INVENTION

This invention relates to a method of compacting freeze-vacuum-dehydrated particulate foods, such as vegetables and meats, so that the dehydrated foods will have substantially greater bulk densities than they do when dehydrated to low moisture contents without compaction, and so that upon rehydration the foods will be restored to substantially the same distinct particulate states in which they existed prior to compaction.

Freeze drying of foods is a well-known method for preserving foods so that they can be stored at room temperature or even higher temperatures for long periods of time, provided they are maintained at very low moisture levels during such storage. When properly prepared and stored, such foods may be rehydrated at the time it is desired to consume them, the reconstituted foods being of quality approaching that of freshly prepared foods of the same types.

In recent years, the military forces have found it to be highly desirable to compact freeze-dried foods so that the foods will occupy appreciably less space in submarines, in aircraft, and also when carried on the person, which may be necessary at times when soldiers are operating in the field.

One of the more widely accepted of conventional methods of compacting freeze-dried foods is in accordance with Ishler et al, U.S. Pat. No. 3,385,715, whereby a food is first freeze-dried to a low moisture level, such as about 1.1 to about 2.2%. Then the freeze-dried food is sprayed with enough water to raise its average moisture content to from about 5 to about 13% so that, when compaction of the freeze-dried food is carried out, the food will not shatter, but will flow while maintaining its cellular structure and the particles of food will adhere to each other when compacted, the moisture serving as a plasticizer and minimizing shattering of the food into fine powder. However, in order for adequate plasticization of the freeze-dried food to occur, the food particles are sprayed with water or an aqueous solution of a gum or the like and are then permitted to stand long enough for the water to substantially equilibrate throughout the food particles. This equilibration process may take several hours (or even days at low temperatures) to occur sufficiently to produce high quality compacted freeze-dried foods. After compaction is carried out, the compacted food is usually freeze-vacuum-dehydrated to a moisture level sufficiently low for the retention of good quality after storage of the type planned for the food. This, of course, means that a substantial amount of freeze drying, an expensive process in itself, has to be repeated to remove the water with which the food particles are sprayed and equilibrated to plasticize the food during compaction. Furthermore, the slowness of the equilibration makes it virtually necessary for the dehydration and compaction process to be carried out in stages rather than in a continuous manner, as would be desirable.

Attempts have been made to avoid the above-mentioned repetition of freeze-drying with the attendant high cost thereof by stopping the initial freeze-drying of the food particles at a moisture level of from about 5 to about 13% and then compacting the partially freeze-dried food. However, as is well known in the food freeze drying art, the cores of the food particles being freeze vacuum dehydrated remains frozen until most of the moisture that is removed from the food has sublimed and the water vapor formed thereby has migrated through the outer portions of the food particles under the influence of the vacuum. Thus, if the freeze-vacuum-dehydration is stopped at 5 to 13 percent moisture content (overall average), as disclosed in the Ishler et al patent, the outer portions of the particles of food are extremely dry while the cores contain essentially their original concentrations of water as ice. If such food particles are then compacted without permitting equilibration to occur, the extremely dry outer portions of the particles shatter and the compacted product has very poor properties, such as poor adhesion and consequent ease of shattering, even with careful handling, and inability to restore the original particle sizes and shapes upon rehydration. To avoid such results, the particles of partially freeze-dried food have been held in closed containers at temperatures above 0° C. to permit equilibration of the moisture from the frozen cores throughout the particles of food. Such equilibration, however, proceeds very slowly; and the larger the particles, the more slowly equilibration occurs. In some cases, a matter of days of equilibration may be required before compaction of the food may be carried out without producing excessive amounts of fines by the shattering of the dry outer portions of the food particles.

Freeze-vacuum-dehydration is inherently a slow and expansive process; and the more repetition of the freeze drying that is necessitated in connection with the compaction of freeze-dried foods, the more expensive the ultimate product will be.

It is an object of the present invention to provide an improved method of compacting freeze-dried particulate foods to relatively high bulk densities so that upon rehydration the foods will be restored to substantially the same distinct particulate form in which they existed prior to compaction of the foods and so that the reconstituted foods will be of high quality and as closely comparable as possible to the original raw or cooked foods from which the freeze-dried particulate foods are prepared.

Other objects and advantages will become apparent from the following description of the invention.

SUMMARY OF THE INVENTION

Compaction of freeze-dried foods is accomplished by partial freeze-vacuum-dehydration of the food in particulate form to from about 10 to about 35 percent average moisture content, thereafter exposing the partially freeze-dried food, beginning such exposure while the food is frozen, to microwaves of a frequency and at an intensity and for a time such that the moisture remaining in the food rapidly becomes distributed throughout the food to such an extent that the food becomes substantially uniformly plasticized throughout its mass, then compressing the substantially uniformly moisture-plasticized food at a pressure selected to produce the degree of compaction and the density desired, compression being carried out to from about 5 to about 50 percent of the volume occupied by the food prior to compression thereof, then redehydrating the compacted food to a moisture content of not over about 5 percent. The redehydrated, compacted food is hermetically sealed in a moisture-impermeable container to protect the food until the time arrives for rehydration of the food to be carried out.

DESCRIPTION OF THE PREFERRED EMBODIMENTS

One aspect of this invention is that foods in particulate form may be partially freeze dried, then irradiated with microwaves either in one short exposure or in a plurality of spaced apart very short exposures so that the moisture remaining in the cores of the particles of food as ice following partial freeze dehydration is quickly vaporized and caused to redistribute itself or equilibrate throughout the particles of food. This enables compaction of the food to be carried out soon after completion of partial freeze dehydration of the food. It further makes it practical to carry out the compaction of the food at an overall average moisture content of the food somewhat higher than is possible in the Ishler et al process since the moisture is more uniformly distributed throughout the food after the exposure to microwaves than is usually true of food processed in accordance with the prior art procedure of Ishler et al. This means that the freeze-vacuum-dehydration can be cut short, thus appreciably reducing cost of dehydration.

After compaction of the food, it may be redehydrated either by vacuum dehydration without freezing, or by air drying, or by freeze-vacuum-dehydration, or by other conventional dehydration procedures, to produce a final redehydrated, compacted food mass which, when properly packaged, may be safely stored at room temperature or even higher temperatures for long periods of time, and which may at any desired time after the redehydration be reconstituted by rehydration procedures to a particulate form of the food closely approximating the distinct particulate form in which the food existed prior to the initial freeze-vacuum-dehydration thereof. Also, the reconstituted food is generally of a high quality even after long-term storage of the food in the redehydrated, compacted state. Naturally it is to be expected that time and temperature will produce some adverse effects on any food item in any form, but when particulate foods are processed in accordance with the process of the invention, the reconstituted food products are surprisingly similar in most respects to the original foods prior to the freezing and partial freeze-vacuum-dehydration thereof.

The partial freeze-vacuum-dehydration is carried out until the average moisture content of the particles of food is reduced to from about 10 precent to about 35 percent. The type of food being processed enters importantly into determining the average moisture level to which the food is partially freeze dehydrated before irradiation with microwaves and compaction.

Since a greater amount of the microwave energy is absorbed the greater the amount of moisture there is in the food particles, it is desirable that the moisture content of the partially freeze-dried food particles not be so low as to cause absorption of the microwave energy to be slowed down too much during the irradiation of the partially freeze-dried foods. It is desirable to redistribute the water throughout the particles of partially freeze-dried food rapidly so that the compaction of the food can be carried out as soon as possible after partial freeze dehydration has been terminated. It is also important that there not be so much moisture left in the particles of food that liquid water will be in contact with any portion of the food for an appreciable length of time since the quality of the final product may be adversely affected by prolonged contact of the food with liquid water. For each particulate food there will be an optimal moisture content for the partially freeze-dried material. However, it is to be understood that the process of the invention will operate with reasonable success over a range of moisture contents for every particulate food. As a result of a substantial number of tests of different foods, the general moisture range for partially freeze-vacuum-dehydrated foods has been established at from about 10 percent to about 35 percent. In all cases throughout the specification and claims when precent water or percent moisture is stated, it is intended to be in terms of percent by weight unless otherwise indicated.

The partial freeze-vacuum-dehydration of the particulate foods may be carried out by any conventional process for freeze-vacuum-dehydrating food products.

The partially freeze-dried particulate food may be passed through a conventional microwave tunnel, such as those disclosed in Hagopian, U.S. Pat. No. 2,685,833, Jeppson, U.S. Pat. No. 3,427,171, or Jeppson, U.S. Pat. No. 3,437,495, and irradiated with microwave energy on a continuous basis. A microwave scanner may be employed to control the application of the microwave energy to the food. The food may be placed on a belt travelling at adjustable speeds under the microwave beam. The microwave irradiation may also be carried out on a batch basis, as in a microwave oven, but this is in general less desirable and more expensive than continuous microwave irradiation. The frequency of the microwaves may be varied to suit the food being treated and the depth of penetration required and the time within which it is desired to complete the irradiation. The microwave irradiation and the moisture content of the food particles should be adjusted so that the partially freeze-dried food particles will be ready for compaction within one hour or less after completion of the partial freeze dehydration, and preferably within from 10 seconds to 5 minutes after such time. In this way the quality of the food is maintained at a high level. The water remaining in the frozen core after partial freeze-vacuum-dehydration is flashed out of the core as water vapor by the microwave energy and is absorbed throughout the dry outer portions of the particles except for small amounts of water vapor that may escape from the particles. If proper adjustment is made between the amount of water in the cores of the particles at the beginning of the microwave treatment and the time and intensity of the microwave treatment, the particles of food will be readily compressible when they are discharged from the microwave tunnel or oven. Excessive exposure of the food to the microwaves should be avoided since too much moisture may be lost from the particles of food in such an event.

The compaction of the microwave-treated particles of food may be carried out at room temperatures (about 20° C.) or higher temperatures, if desired, in a press at pressures of from about 200 psi to about 4000 psi, employing a dwell time of about 10 to 30 seconds. The compressed food mass may take various forms and may be produced in various sizes. I have found it particularly advantageous to produce either compressed bars or compressed discs of from about 0.3 cm to about 1.25 cm thickness. I have found it desirable to compress the food to from about 5 percent to about 50 percent of the volume occupied by the food prior to compression thereof.

Thus the compression ratio (see definition below) is from about 20:1 to about 2:1. When the partially freeze-dehydrated food particles are compressed as described above with the moisture content of the partially freeze-vacuum-dehydrated food adjusted within the 10-35 percent range and redistributed by the microwave treatment, very little if any shattering with production of fines occurs. The compressed food particles adhere well and produce compacted forms of the food which occupy appreciably less space than the original particulate food.

The compressed food mass is removed from the press and redehydrated to a moisture content of from about 1 to about 5% and, preferably for long-term storage, not more than about 2%, to provide stability of the food when it is packaged in a moisture impermeable container. This may be accomplished by air drying with heated air to about 5% moisture content or by vacuum oven drying in conventional vacuum drying equipment to moisture contents as low as about 3%. If redehydration to still lower moisture contents is desired, it will be most conveniently accomplished by freeze-vacuum-dehydration using conventional freeze-vacuum-dehydration equipment and procedures. It is, of course, desirable to avoid excessive heating of any portion of the compacted food mass during the redehydration thereof. Consequently, if air drying is employed, the air is heated to from about 100° to about 160° F. If vacuum oven drying or freeze-vacuum-dehydration is used, the surface contacted by the food should preferably be at a temperature no higher than 140° F. to avoid thermal damage to the food. The densities of the compressed and redehydrated food masses will generally be from about 0.5 to about 1.2 grams per cc. Redehydration is the second and final dehydration step that is carried out after the food mass is compressed.

Following redehydration, the compressed food mass, if not to be used immediately, as is usually the case, is enclosed in a package which is impermeable to moisture, and preferably impermeable to oxygen, and hermetically sealed therein. Such a package may be a metal can, but may also be a flexible package made of a laminate which usually comprises one lamina which is heat-sealable and is the innermost lamina of the package, such as polyethylene, another lamina, which is strong and resistant to the most common types of damage, such as polyethylene terephthalate, and is employed as the outermost lamina; while aluminum foil, which acts as an effective barrier to moisture, is sandwiched between the inner heat-sealable polyethylene lamina and the strong outer lamina of polyethylene terephthalate. When hermetically sealed in metal cans or the type of laminated flexible package described above, the compressed and redehydrated food mass having a moisture content of not more than 5% will usually be safely storable for at least 3 years at 70° F. or at least 6 months at 100° F. without any appreciable reduction in acceptability from the acceptability it exhibited immediately following partial freeze-vacuum-dehydration, microwave irradiation, compression, and redehydration as described above. Acceptability varies from one food to another, depending to a considerable extent on personal preferences; but reasonably reproducible procedures for evaluating quality characteristics and acceptability by scale testing have been developed.

Reconstitution of the dehydrated compacted food mass is carried out by pouring an excess of boiling water over the compacted food mass and letting the food mass stand in contact with the hot water until rehydration occurs. The thus reconstituted food is then ready to be cooked or in some cases directly consumed. In general, meats require much longer times to rehydrate than vegetables require since meats are largely protein in content, whereas vegetables generally contain a high percentage of carbohydrate.

Quality evaluation is carried out on food masses which have been partially freeze-vacuum-dehydrated, microwave irradiated, compacted, and redehydrated, then rehydrated, and in some cases cooked, in accordance with the invention. The food mass is reconstituted as described above and tested for quality by submitting the reconstituted food to a panel of about ten trained food technologists who assign ratings for each quality characteristic being evaluated with respect to each food. The ratings are based on a scale of from 1 to 9 in which 9 represents excellent, 1 represents extremely poor, and 5 represents borderline acceptability. For any particular quality characteristic evaluated, if the average scale value is at least 5, the food is definitely acceptable with respect to that quality characteristic. Overall quality may be estimated by averaging the various scale values for the different quality characteristics tested.

The invention has been found to be particularly effective with those foods which occur naturally in particulate form or which are frequently subdivided into particle or morsel forms for the purpose of preservation or preparation for eating. For example, peas, cut green beans, diced carrots, diced beef, as well as many other particulate foods may be processed in accordance with the invention. The important consideration is that these types of food particles retain the cellular structure of the food substantially in the form occurring in the plant or animal from which the food is obtained or in which such particles have developed widespread acceptability by the public with respect to the particular food under consideration. Either uncooked or cooked foods in particulate form may be treated in accordance with the invention, the determination of which form of a given food to employ depending on the effect of cooking on the particular food and whether it is desirable to consume the rehydrated food without cooking after rehydration. Meat particles, for example, are more likely to retain their particulate form throughout the process when cooked than are vegetables, which in many instances have a tendency to become soft and sometimes mushy as a result of cooking and thereby to lose their particulate forms even before being compressed. For example, it is generally preferable to process peas in accordance with the invention while they are still in the uncooked state. It may be desirable to blanch uncooked vegetables prior to freezing, partial freeze-vacuum-dehydration, microwave treatment, compaction, and redehydration thereof in accordance with the invention.

I will now disclose several specific examples of the production of dehydrated, compacted food masses of increased density in accordance with the above-described principles of the invention. It will be understood, of course, that the above-mentioned and other advantages of my invention may also be accomplished by suitable variations in the detailed method steps, about to be set forth below, which are intended to be for illustrative purposes, and not for limiting the scope of my invention.

In the examples, compression ratio is to be understood to be the ratio of the volume of the uncompressed, partially freeze-vacuum-dehydrated food morsels or particles, shaken by hand to effect settling in a container, to the volume of the compressed, partially freeze-vacuum-dehydrated food, whether the compressed food be in disc or bar form or some other suitable compacted mass.

In the example, the rehydration ratio of the food is the ratio of the weight of the food after rehydration to the weight of the redehydrated, compacted food prior to rehydration thereof.

EXAMPLE I

Fresh green peas were blanched by exposing them to water heated to about 205° F. for 5 minutes. The blanched peas were drained free of surface water, then frozen, and freeze-vacuum-dehydrated in conventional freeze drying equipment employing a platen temperature of about 140° F. After about 4½ hours of freeze drying, the average moisture content of the peas had been reduced to about 17 percent. At this point a substantial portion of the partially freeze-dried peas was removed from the freeze dryer and held in the frozen state in a tightly closed container until further processing could be carried out. The freeze-vacuum-dehydration of the peas remaining in the freeze dryer was continued for about 7½ hours longer until the moisture content of these peas had been reduced to about 2 percent. These freeze-dried peas were used as a control for comparative purposes.

The partially freeze-dried peas having a moisture content of about 17 percent were subjected to microwave irradiation in a conventional microwave oven in two portions, one portion of which was subjected to the microwaves for 20 seconds while the other portion was subjected to the microwaves for 30 seconds. The microwaves had a frequency of about 2450 megaherz and the output of the microwave source was rated at 650 watts. Immediately after removal from the microwave oven, about 20 grams of each batch of irradiated, partially freeze-dried peas was placed in a Carver hydraulic press having a rectangular cross-sectional area of 3 square inches and immediately compressed at room temperature and at about 1500 psi pressure, employing a dwell time of about 10–20 seconds, to produce a bar of compressed peas of the dimensions 1 × 3 × 0.5 inches, the compression ratio being about 4:1. Each bar of compressed, partially freeze-dried peas was placed in a conventional vacuum oven and further dried at an oven temperature of about 140° F. to a final moisture content of about 3.8 percent by weight. The density of the final compressed bars of peas was about 0.89 grams per cc.

The freeze-dried control peas were sprayed uniformly with a fine mist of sufficient water to raise their moisture content to about 12 percent by weight. After the spraying, the peas were held in a tightly closed chamber for 0.5 hour at room temperature to allow thorough equilibration of the moisture throughout the peas to take place. The equilibrated control peas were then compressed in quantities of about 20 grams at a time in a Carver hydraulic press such as that used with the experimental peas and at room temperature and at about 1500 psi pressure employing a dwell time of about 10–20 seconds to produce bars of compacted control peas of dimensions similar to the experimental bars, the compression ratio being about 4:1. Each control bar of peas was placed in a conventional vacuum oven such as that used for further dehydrating the experimental peas and the bars of control peas were further dried at an oven temperature of about 140° F. to a final moisture content of about 3 percent by weight.

The bars of experimental compacted peas and the compacted control peas were reconstituted by pouring an excess of water, brought to the boil, over a compacted bar of peas and permitting the bar of peas to stand in the hot water for a length of time as needed to substantially rehydrate the peas, this time amounting to from about 0.5 to about 3 minutes. The rehydration ratio for the experimental bars of peas was about 4.3:1.

The reconstituted experimental peas and the reconstituted control peas were subjected to quality evaluation by a technological panel of 10 food technologists who were experienced in evaluating the characteristics of foods. The evaluations were based on a scale described above. Table 1 gives the results of these evaluations.

TABLE 1

| Average Quality Ratings of the Peas | | |
|---|---|---|
| | Texture | Flavor |
| Control | 5.8 | 6.8 |
| 20 second microwave treated | 6.1 | 6.7 |
| 30 second microwave treated | 6.3 | 6.9 |

It is apparent from the results in Table 1 that both of the experimental samples of peas, following reconstitution, had more acceptable texture than the control sample of peas. The texture values for the experimental samples were significantly better than for the control statistically. There was very little noticeable difference in flavor between either of the experimental samples and the control sample.

EXAMPLE II

Cubes of raw round of beef about 0.5 inch on each side were frozen rapidly and thereafter freeze-vacuum-dehydrated in conventional freezedrying equipment employing a platen temperature of about 125° F. After about 4½ hours of freeze drying, the average moisture content of the beef dice had been reduced to about 35 percent by weight. The partially freeze-dried beef dice were removed from the freeze dryer and held in the frozen state in a tightly closed container until further processing could be carried out. One portion of the partially freeze-dried beef dice were used as a control for comparative purposes. The remaining partially freeze-dried beef dice having a moisture content of about 35 percent were subjected to microwave irradiation in a conventional microwave oven for 30 seconds. The microwaves had a frequency of about 2450 megaherz and the output of the microwave source was rated at 650 watts. Immediately after removal from the microwave oven, about 20 grams of the irradiated, partially freeze-dried beef cubes was placed in a Carver hydraulic press having a rectangular cross-sectional area of 3 square inches and immediately compressed at room temperature and at about 1500 psi pressure, employing a dwell time of about 10–20 seconds, to produce a bar of compressed raw beef of the dimensions 1 × 3 × 0.5 inches, the compression ratio being about 3 to 1. Each bar of compressed partially freeze-dried, raw beef was placed in a conventional vacuum oven and further dried at an oven temperature of about 140° F. to a final moisture content of about 2.8 by weight.

The partially freeze-dried control beef dice were compressed in quantities of about 20 grams at a time in a Carver hydraulic press such as that used with the experimental beef dice and at room temperature and at about 1500 psi pressure employing a dwell time of about 10–20 seconds to produce bars of compressed control beef of dimensions similar to the experimental beef bars, the compression ratio being about 3:1. Each control bar of beef was placed in a conventional vacuum oven such as that used for further dehydrating the experimental beef and the bars of control beef were further vacuum dried at an oven temperature of about 140° F. to a final moisture content of about 3 percent.

The bars of compressed and redehydrated beef and the control bars therefor were reconstituted by pouring an excess of water brought to the boil over a compacted bar of beef and allowing the bar to stand in the water until rehydration occured. It was found that the experimental bars of beef separated into the individual beef dice in about 5 hours and that the dice became fully rehydrated, that is, restored to the original size and shape thereof, after about 6 hours soaking. The control bars of beef did not separate into individual beef dice even after 6 hours standing in the water.

EXAMPLE III

The procedure of Example I was followed with dice of raw carrots about $\frac{1}{4}$ inch on each side with the following exceptions. The temperature of the platens in the freeze dryer was about 125° F. After about 6 hours of freeze drying, the moisture content of the partially freeze-dried carrot dice was about 29 percent. Some of these carrot dice were removed from the freeze dryer and further processed as discussed below. The freeze drying was continued and after a total of 10 hours of freeze drying, the moisture content of the partially freeze-dried carrot dice was about 19 percent. Some of these carrot dice were removed from the freeze dryer and further processed as discussed below.

The experimental carrot dice were exposed to microwaves in a similar manner to that employed for the peas of Example I but for 50 seconds exposure in the case of the carrot dice having 29 percent moisture remaining therein and for 60 seconds exposure in the case of the carrot dice having only 19 percent moisture remaining therein.

Immediately after being irradiated with the microwaves for the time stated, each experimental sample of carrot dice was compressed at room temperature and at a compression ratio of about 12:1 to produce carrot bars of substantially the dimensions of the bars of peas of Example I.

Following compression, the carrot bars were redehydrated in a conventional vacuum oven in the same manner as the peas of Example I to a final moisture content of about 3 percent. The density of the final redehydrated carrot bars was about 0.53 grams per cc.

A portion of each batch of partially freeze-vacuum-dehydrated carrot dice, i.e. one portion containing 29 percent moisture and the other 19 percent moisture, was used as a control for carrot dice of the corresponding moisture content. It was compressed, without being subjected to microwave treatment prior to compression, in the same manner as the experimental carrot dice and without allowing equilibration of the moisture remaining therein to occur. The compressed control bars of carrots were redehydrated in the same manner as the bars of the experimental carrot dice.

The bars of experimental carrots and the control bars therefor were reconstituted in the same manner as were the peas of Example I. The carrots which were partially freeze-vacuum-dedydrated to 19 percent moisture content prior to microwave irradiation and compression became substantially fully rehydrated after about 3 minutes in the hot water and the reconstituted carrot dice exhibited good size and shape characteristics and had good acceptability. The carrots which were partially freeze-vacuum-dehydrated to 29 percent moisture content prior to microwave irradiation and compression became substantially fully rehydrated after about $2\frac{1}{2}$ minutes in the hot water and the reconstituted dice exhibited good size and shape characteristics and had good acceptability. The experimental carrots exhibited a rehydration ratio of about 15:1. The control carrot bars required about 13 to 20 minutes for rehydration and produced an excessive amount of sediment in the rehydration water, thus indicating considerable fracturing during compression.

EXAMPLE IV

In this example, peas were processed similarly to the processing of the peas in Example I with the following exceptions. After about $4\frac{1}{2}$ hours of freeze drying, the moisture content of the partially freeze-dried peas was about 26.8 percent. Some of these peas were removed from the freeze dryer and further processed as discussed below. The freeze drying was continued and after a total of 6 hours of freeze drying, the moisture content of the partially freeze-dried peas was about 12.8 percent. Some of these peas were removed from the freeze dryer and further processed as discussed below.

The experimental peas were exposed to microwaves in a similar manner to that employed for the peas of Example I but for 40 seconds exposure in the cases of both experimental samples of partially freeze-dried peas.

Immediately after being irradiated wih the microwaves for the time stated, each experimental sample of peas was compressed at room temperature and at a compression ratio of about 4:1 to produce pea bars of substantially the dimensions of the bars of peas of Example I.

Following compression, the pea bars were redehydrated in a conventional vacuum oven in the same manner as the peas of Example I to a final moisture content of about 3 percent. The density of the final redehydrated pea bars was about 0.89 grams per cc.

A portion of each batch of partially freeze-vacuum-dehydrated peas, i.e. one portion containing 26.8 percent moisture and the other 12.8 percent moisture, was used as a control for peas of the corresponding moisture content. It was compressed, without being subjected to microwave treatment prior to compression, in the same manner as the experimental peas but without allowing equilibration of the moisture remaining therein to occur. The compressed control bars of peas were redehydrated in the same manner as the bars of the experimental peas.

The bars of experimental peas and the control bars therefor were reconstituted in the same manner as were the peas of Example I. The peas which were partially freeze-vacuum-dehydrated to 26.8 percent moisture content prior to microwave irradiation and compressed became substantially fully rehydrated after about $\frac{1}{2}$ minute to 1 minute in the hot water and the reconstituted peas exhibited good size and shape characteristics and had good acceptability. The peas which were partially freeze-vacuum-dehydrated to 12.8 percent moisture content prior to microwave irradiation and compression became substantially fully rehydrated after about 2 to 3 minutes in the hot water and the reconsitituted peas exhibited good size and shape characteristics and had good acceptability. The experimental peas exhibited a rehydration ratio of about 15:1. The control pea bars required about 3 minutes for rehydration and produced an excessive amount of sediment in the rehydration water, thus indicating considerable fracturing of the control peas during compression. This was in contrast to the good shape and size retention and lack of sediment noted with the reconstituted experimental peas and showed that the microwave treatment of the partially freeze-dried peas prior to compression thereof was very effective in enabling the compacted peas to retain good size and shape characteristics with little or no fracturing of the peas during compression.

Although the invention has been described in terms of the use of microwaves of a frequency of about 2450 megaherz for irradiating the frozen, partially freeze-vacuum-dehydrated food, it is to be understood that microwaves of other frequencies may be employed. In general, commercial microwave ovens and other microwave irradiating equipment manufactured in this country are limited to either 2450 ± 50 megaherz or 915 ± 25 megaherz. Such equipment may be rated at various amounts of power; so that the time of exposure of the partially freeze-vacuum-dehydrated food to the microwave energy will depend on the amount of power and the penetrating efficiency of the microwaves and, therefore, the frequency of the microwaves, as is well understood in the art.

It is apparent from the above results that a wide variety of vegetables and meats may be processed in accordance with the present invention to produce dehydrated, compacted food masses of increased density characterized by good particle size and shape and cellular structure and good acceptability when rehydrated. When such products are hermetically sealed, preferably under vacuum, in moisture-impermeable containers, they retain substantially as good acceptability after relatively long-term storage, for example, at least 3 years at temperatures up to 70° F. or at least 6 months at temperatures up to 100° F., as the dehydrated, compacted food masses had immediately following redehydration thereof.

The invention is particularly useful for reducing the volume occupied by, and the weight of, a given quantity of the food insofar as nutritional value and caloric content are concerned. The dehydrated, compacted food masses are readily reconstituted and prepared for consumption by various rehydration procedures. The process of the invention is more economical than prior processes for the compacting of freeze-vacuum-dehydrated foods which are highly desirable because of their retention of the cellular structures characteristic of foods in their natural state despite the removal of most of the water therefrom and the compaction thereof.

It will be understood that various changes in the details, materials and arrangements of parts which have been herein described and illustrated in order to explain the nature of the invention, may be made by those skilled in the art within the principle and scope of the invention.

I claim:

1. A process for making a dehydrated, compacted food mass selected from the group consisting of vegetables and meats characterized by having a density of from about 0.7 to about 1.2 grams per cc and being capable of rehydration to produce distinct particles of rehydrated food which have substantially the same size, shape, and cellular structure characteristics as the particles of food from which said dehydrated, compacted food mass is prepared and which are acceptable in accordance with scale testing, which comprises the steps of:

a. partially freeze-vacuum-dehydrating particles of a food selected from the group consisting of vegetables and meats to a moisture content of from about 10 percent to about 35 percent by weight;

b. irradiating said partially freeze-vacuum-dehydrated particles of food with microwave radiations, the core portions of said particles being frozen at the beginning of said microwave irradiation, said irradiation being carried out at a frequency and intensity of said microwave radiations and for a time sufficient to produce redistribution of said moisture remaining in said particles substantially uniformly throughout said particles so as to plasticize said particles substantially uniformly throughout the same;

c. comprising said plasticized particles at a pressure of from about 200 psi to about 4000 psi for a period of time sufficient to cause said particles to adhere together forming a compacted food mass while maintaining the moisture content of said particles and said compacted food mass at from about 10 to about 35 percent by weight; and d. redehydrating said compacted food mass to form a redehydrated, compacted food mass having a moisture content of from about 1 percent to about 5 percent by weight.

2. A process according to claim 1, wherein said step of redehydrating said compacted food mass is carried out by vacuum oven drying said compacted food mass.

3. A process according to claim 1, wherein said step of redehydrating said compacted food mass is carried out by air drying said compacted food mass with heated air.

4. A compacted, dehydrated food mass produced in accordance with the process of claim 1.

5. A compacted, dehydrated food mass according to claim 4, wherein said food mass consists essentially of peas.

6. A compacted, dehydrated food mass according to claim 4, wherein said food mass consists essentially of carrots.

7. A compacted, dehydrated food mass according to claim 4, wherein said food mass consists essentially of beef.

* * * * *

UNITED STATES PATENT OFFICE
CERTIFICATE OF CORRECTION

PATENT NO. : 4,096,283

DATED : June 20, 1978

INVENTOR(S) : Abdul R. Rahman

It is certified that error appears in the above-identified patent and that said Letters Patent are hereby corrected as shown below:

Column 2, line 34, "expansive" should read --expensive--. Column 8, line 64, insert --percent-- after "2.8". Column 10, line 61, "compressed" should read --compression--. Column 12, line 30, "comprising" should read --compressing--.

Signed and Sealed this

Fifteenth Day of May 1979

[SEAL]

Attest:

RUTH C. MASON
Attesting Officer

DONALD W. BANNER
Commissioner of Patents and Trademarks